US007054612B2

(12) United States Patent
Patel

(10) Patent No.: US 7,054,612 B2
(45) Date of Patent: May 30, 2006

(54) MESSAGE BROADCAST TO MOBILE STATION IN WIRELESS NETWORK

(75) Inventor: Yogesh C. Patel, Bloomingdale, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 213 days.

(21) Appl. No.: 10/600,067

(22) Filed: Jun. 20, 2003

(65) Prior Publication Data

US 2004/0259568 A1 Dec. 23, 2004

(51) Int. Cl.
*H04M 11/04* (2006.01)
(52) U.S. Cl. ............................ 455/404.1; 455/404.2; 455/414.3; 340/7.48; 340/905; 725/33; 725/34
(58) Field of Classification Search ............ 455/404.1, 455/404.2, 412.1, 412.2, 456.5, 466; 340/539.1, 340/539.11, 539.28, 540, 7.48, 905; 725/33, 725/34, 36
See application file for complete search history.

(56) References Cited

U.S. PATENT DOCUMENTS

| 5,029,290 A | | 7/1991 | Parsons et al. | |
|---|---|---|---|---|
| 6,204,761 B1 | * | 3/2001 | Vanderable | 340/539.28 |
| 6,452,492 B1 | | 9/2002 | Drury | |
| 6,543,051 B1 | * | 4/2003 | Manson et al. | 725/33 |
| 6,867,688 B1 | * | 3/2005 | Lamb | 340/286.02 |
| 2002/0131397 A1 | * | 9/2002 | Patel et al. | 370/349 |
| 2003/0137415 A1 | * | 7/2003 | Thomson | 340/539.1 |
| 2003/0143974 A1 | * | 7/2003 | Navarro | 455/404 |
| 2003/0179089 A1 | * | 9/2003 | Sweatt | 340/539.1 |

OTHER PUBLICATIONS

47 CFR Part 11, Emergency Alert System (EAS), Mar. 7, 2003.
Emergency Alert System, 2001 AM & FM Handbook, Federal Communications Commission, 2001.

* cited by examiner

*Primary Examiner*—Danh Cong Le

(57) ABSTRACT

A wireless network that broadcasts a message from a telecommunication system to mobile stations associated with the wireless network is provided. The wireless network includes one or more mobile switching centers, one or more base stations, and one or more mobile stations. In various embodiments, the telecommunication system may include an emergency alert system and/or a public switched telephone network along with the wireless network. The message may include a presidential message, a local area message, a state message, a national information center message, a weather news report, a headline news report, a traffic news reports, or a promotional advertisement. Several methods for broadcasting the message in a wireless network are provided.

26 Claims, 3 Drawing Sheets

MESSAGE BROADCAST TO MOBILE STATION IN WIRELESS NETWORK

BACKGROUND OF INVENTION

The invention generally relates to a wireless network and, more particularly, to a wireless network that augments a telecommunication system to broadcast a message from the telecommunication system to mobile stations associated with the wireless network and will be described with particular reference thereto. However, it is to be appreciated that the invention is also amenable to other applications.

Many types of telecommunications systems provide information and entertainment content to large numbers of end users. For example, AM, FM, and TV broadcast stations deliver news, entertainment, advertisements, and other types of programs via RF transmissions. Cable systems and satellite systems deliver similar content to subscribers.

Various parts of this telecommunication infrastructure are used by an emergency alert system (EAS) that provides the President of the United States with the capability to provide immediate communications and information to the public at the national, state, and local levels during periods of national emergency. The EAS may also be used to provide the heads of state and local government, or their designated representatives, with a means of emergency communication with the public in their state or local area. Law enforcement agencies may use the EAS as part of America's Missing: Broadcast Emergency Response (AMBER) alerts to provide urgent bulletins in the most serious child abduction cases.

The Federal Communication Commission (FCC), in conjunction with the National Weather Service (NWS) and the Federal Emergency Management Administration (FEMA), implements the EAS. The FCC promulgated federal regulations (47 CFR Part 11) to define and regulate the EAS. The FCC provides information to broadcasters, cable system operators, and state and local emergency managers. The FCC also ensures state and local EAS plans comply with the FCC rules. The NWS handles emergency weather information to alert the public of dangerous conditions. FEMA contributes assistance to state and local emergency planning officials to help develop and execute their active participation in the EAS.

During certain times, persons desiring to receive the information or entertainment content described above may not have access to radios, televisions, or similar devices currently available for reception of such content. For example, during an electricity outage, persons may not have battery-powered radio or television. Moreover, an emergency shelter may not be equipped with or equipped to handle a radio or television. In a more common situation, a person may not have access to a radio or telephone when they are out of their home. These same persons may be carrying or have access to a mobile station (MS), such as a cellular telephone, that has access to a wireless network.

Thus, there is a particular desire for a wireless network that augments a telecommunication system by broadcasting a message from the telecommunication system to mobile stations associated with the wireless network.

BRIEF SUMMARY OF INVENTION

In one aspect of the invention, an embodiment of a method for broadcasting a message in a wireless network is provided. The method includes: a) receiving a message notice that a message to be broadcast by the wireless network is to follow and instructions designating a geographic area associated with the message broadcast; b) transmitting the message notice to one or more mobile stations associated with the designated geographic area; c) receiving the message to be broadcast; d) broadcasting the message over a broadcast channel associated with the wireless network and the designated geographic area; e) receiving a termination notice associated with the message broadcast; f) terminating the message broadcast in response to receiving the termination notice; and g) transmitting the termination notice to the one or more mobile stations.

In another aspect of the invention, another embodiment of a method for broadcasting a message in a wireless network is provided. The method includes: a) at one or more mobile switching centers, receiving a message notice that a message to be broadcast by the wireless network is to follow, receiving instructions designating a geographic area associated with the message broadcast, and communicating the message notice to one or more base stations associated with the designated geographic area; b) at the one or more base stations, transmitting the message notice to one or more mobile stations associated with the designated geographic area; c) at the one or more mobile stations, activating a message notice cue in response to receiving the message notice; d) at the one or more mobile switching centers, receiving the message to be broadcast and communicating the message to the one or more base stations; e) at the one or more base stations, broadcasting the message over a broadcast channel associated with the wireless network and the designated geographic area; f) at any of the one or more mobile stations, responding to activation of one or more control buttons to connect the corresponding mobile station to the broadcast channel to receive the broadcast message; g) at the one or more mobile switching centers, receiving a termination notice associated with the message and communicating the termination notice to the one or more base stations; h) at the one or more mobile switching centers, terminating the message broadcast in response to receiving the termination notice; i) at the one or more base stations, transmitting the termination notice to the one or more mobile stations; and j) at the one or more mobile stations, activating a message termination cue in response to receiving the termination notice.

In still another aspect of the invention, a wireless network to augment a telecommunication system by broadcasting a message from the telecommunication system to mobile stations associated with the wireless network is provided. The wireless network includes: a means for receiving a message notice that the message to be broadcast by the wireless network is to follow and instructions designating a geographic area associated with the message broadcast; a means for transmitting the message notice to one or more mobile stations associated with the designated geographic area; a means for receiving the message to be broadcast; a means for broadcasting the message over a broadcast channel associated with the wireless network and the designated geographic area; a means for receiving a termination notice associated with the message; a means for terminating the message broadcast in response to receiving the termination notice; and a means for transmitting the termination notice to the one or more mobile stations.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

Figure 1:
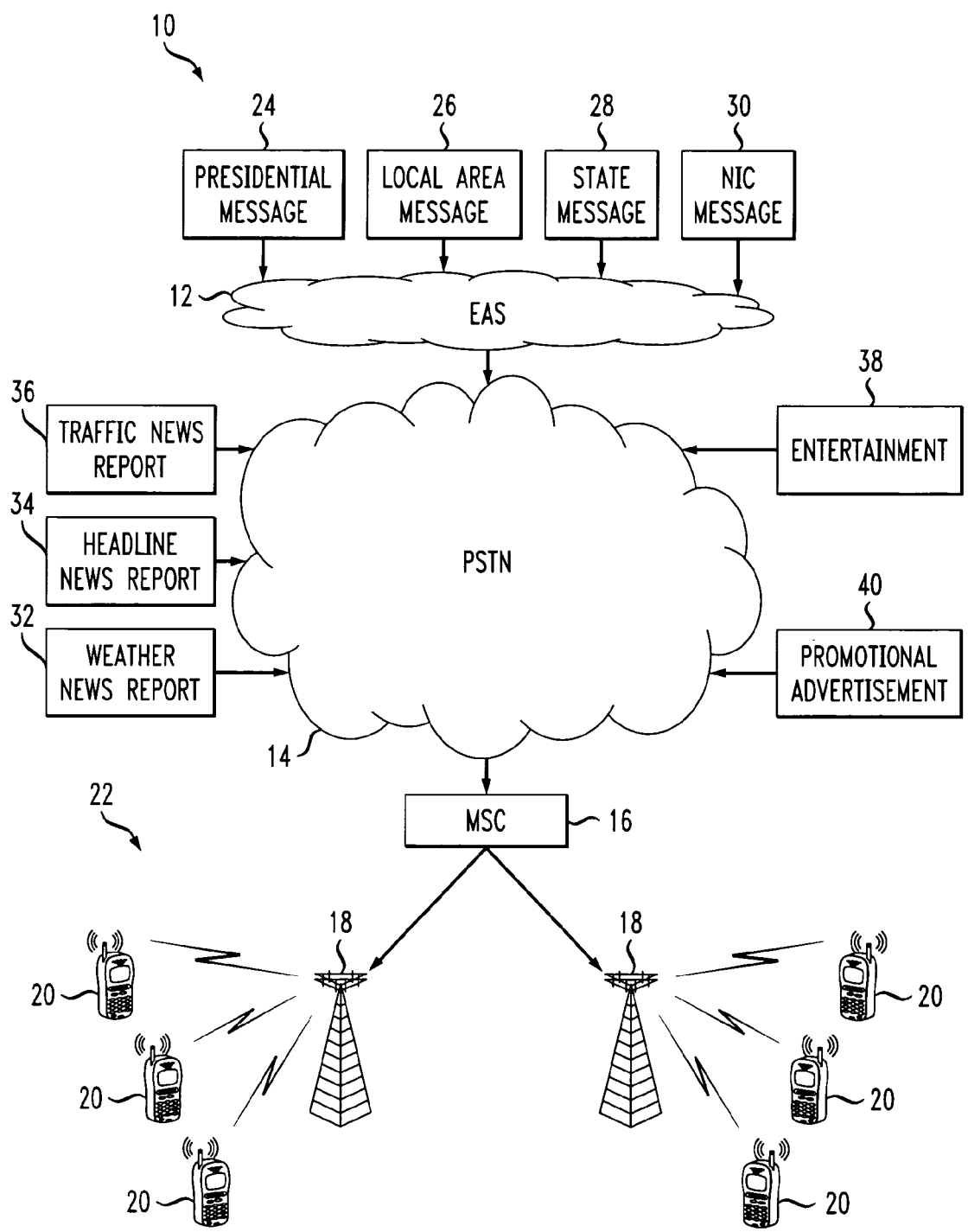
FIG. 1 is a block diagram of an embodiment of a telecommunication system incorporating the invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. In the drawings, like reference numerals denote like elements and similar reference numerals denote similar elements.

With reference to FIG. 1, a telecommunication system 10 incorporating the invention includes an EAS 12, a public switched telephone network (PSTN) 14, one or more mobile switching center (MSC) 16, one or more base station (BS) 18 associated with each MSC, and one or more MS 20 associated with each BS. The MSCs, BSs, and MSs form a wireless network 22 with at least one broadcast voice channel for one way communication.

The wireless network 22, for example, augments the EAS 12 by providing an infrastructure for communication of messages to the public at national, state, and local levels during periods of national emergency. Such messages include presidential messages 24, local area messages 26, state messages 28, and National Information Center (NIC) messages 30. Such message may originate or otherwise be associated with the NWS or another weather service agency, FEMA or another emergency management agency, a law enforcement agency (e.g., sheriff, state police, Federal Bureau of Investigation (FBI), etc.), a security agency (e.g., Homeland Security, etc.), or a public office (e.g., President, Governor, Mayor, etc.).

More specifically, at the national level, such messages may include an emergency action notification, an emergency action termination, a national information center message, a national periodic test, a monthly test, and a weekly test. At the state and local level, such messages may include an administrative action, an avalanche warning, an avalanche watch, a blizzard warning, a child abduction emergency, a civil danger warning, a civil emergency warning, a coastal flood warning, a coastal flood watch, a dust storm warning, an earthquake warning, an evacuation immediate condition, a fire warning, a flash flood warning, a flash flood watch, a flash flood statement, a flood warning, a flood watch, a flood statement, a hazardous materials warning, a high wind warning, a high wind watch, a hurricane warning, a hurricane watch, a hurricane statement, a law enforcement warning, a local area emergency, a network message notification, a 911 telephone outage emergency, a nuclear power plant warning, a practice/demo warning, a radiological hazard warning, a severe thunderstorm warning, a severe thunderstorm watch, a severe weather statement, a shelter in place warning, a special marine warning, a special weather statement, a tornado warning, a tornado watch, a tropical storm warning, a tropical storm watch, a tsunami warning, a tsunami watch, a volcano warning, a winter storm warning, and a winter storm watch.

The wireless network 22 may also augment AM, FM, and TV broadcast stations, cable systems, and satellite systems by providing an infrastructure for communication of news, entertainment, and/or advertisement content to wireless network subscribers. The news, entertainment, or advertisement content may be provided or otherwise associated with a broadcast network, a cable network, a program supplier, an AM broadcast station, an FM broadcast station, a low power FM (LPFM) broadcast station, a TV broadcast station, a class A (CA) TV station, a low power TV (LPTV) station, a cable system, a wireless cable system, a multipoint distribution service (MDS) station, a multichannel multipoint distribution service (MMDS) station, and an instructional television fixed service (ITFS) station. The news, entertainment, and advertising content may be the same as that provided in normal programming or tailored according to addressable geographical areas (e.g., cells, cell sectors) of the wireless network 22. Such content includes weather news reports 32, headline news reports 34, traffic news reports 36, entertainment 38, and promotional advertisement 40.

Figure 2:
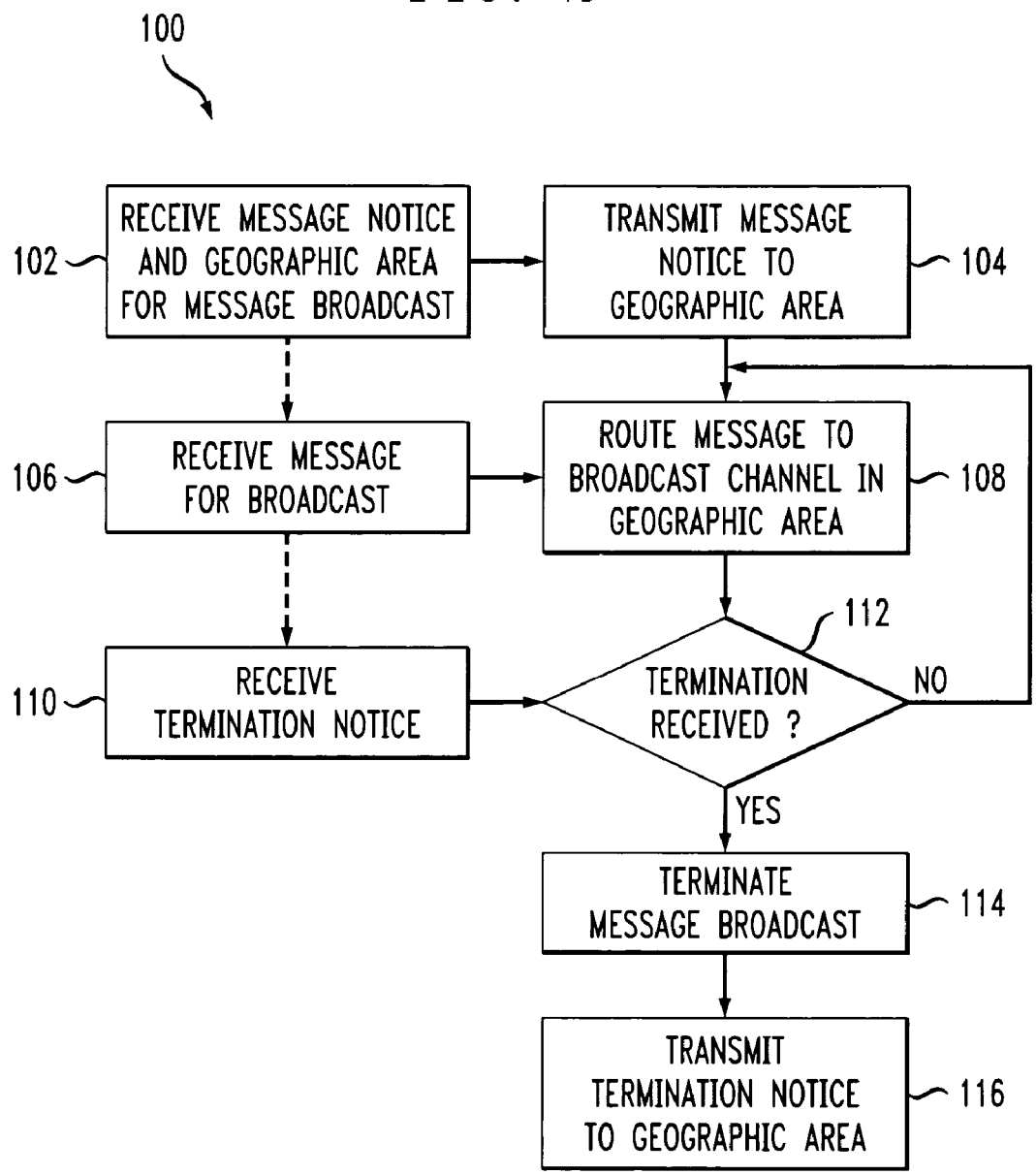
FIG. 2 is a flow chart of an embodiment of a method of message broadcast in a wireless network.

With reference to FIG. 2, a process 100 for broadcasting a message in a wireless network begins at step 102 when a message notice is received as well as instructions designating a geographic area associated with the message broadcast. The designated geographic area may be specified by cell and sector. Therefore, the geographic area may, for example, include a single cell sector, adjoining sectors in two or three cells, a single cell, or multiple cells in various combinations. The message notice indicates that the message to be broadcast is to follow. Typically, the message notice is received by one or more MSCs associated with the designated geographic area. Next, at step 104, the message notice is transmitted to the designated geographic area. Typically, each MSC receiving the message notice communicates the message notice to one or more BSs associated with the designated geographic area. Then, each BS receiving the message notice transmits the message notice to one or more MSs that are currently operating within the designated geographic area. The message notice may be transmitted over a page channel or any other suitable control channel associated with the wireless network.

At step 106, the message to be broadcast is received. Typically, the message is received by the one or more MSCs. Next, at step 108, the message is routed to a broadcast channel associated with the wireless network and the designated geographic area. Typically, each MSC receiving the message communicates the message to one or more BSs associated with the designated geographic area. Then, each BS receiving the message broadcasts the message to the designated geographic area within a cell of the wireless network associated with the BS. Typically, the broadcast channel is a broadcast voice channel that is limited to one-way communication (i.e., receive only with respect to an MS).

The wireless network may include multiple broadcast channels. Therefore, the broadcast channel may be selected dependent upon the content or purpose of the message. For example, a first broadcast channel may handle EAS messages, a second broadcast channel may handle news messages, a third broadcast channel may handle entertainment messages, and a fourth broadcast channel may handle advertisements.

The wireless network may repeatedly broadcast the message until a termination notice is received in step 110. Therefore, at step 112, the wireless network may determine whether the termination notice has been received. If the termination notice has not been received, step 108 is repeated. However, if the termination notice has been received, the message broadcast is terminated at step 114 and the termination notice is transmitted to the designated geographic area at step 116. Typically, each MSC receiving the termination notice communicates the termination notice to one or more BSs associated with the designated geographic area. Then, each BS receiving the termination notice transmits the termination notice to one or more MSs that are currently operating within the designated geographic area. The termination notice may be transmitted over the page channel or any other suitable control channel associated with the wireless network.

The message notice, message, and termination notice may be provided to the wireless network from any of the EAS, AM, FM, or TV broadcast stations, cable systems, or satellite systems identified above in the description of FIG. 1.

Figure 3:
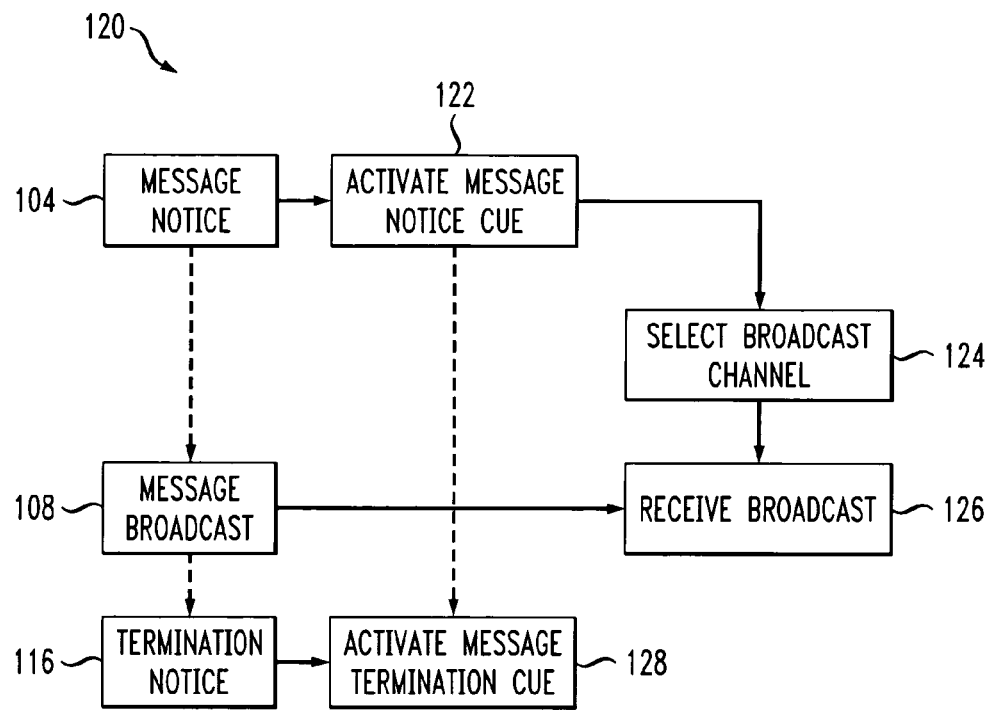
FIG. 3 is a flow chart of an embodiment of a method of message broadcast in a wireless network from a mobile station perspective.

With reference to FIG. 3, a process 120 for receiving a message broadcast at an MS begins at step 104 when the message notice is received by the MS. This process assumes the MS is currently operating within the designated geographic area and applies equally to other similarly situated MSs. At step 122, the MS activates a message notice cue in response to receiving the message notice. The message notice cue may include a visual indicator, an audible tone, a vibration frequency or any combination thereof. For example, the message notice cue may include illumination of an indicator and/or display of certain textual or graphical information on a display device. Alternatively, the audible tone may include a distinctive ring based on the type of message to be broadcast. Similarly, the visual indicator and vibration frequency may be distinctive based on the type of message to be broadcast. If the MS is currently participating in an active call, depending on the type of message to be broadcast, the wireless network may terminate the call when the message notice is received. Otherwise, the wireless network may permit a user associated with the MS to optionally elect to terminate the call.

Next, at step 124, assuming the MS does not have an active call, in response to the message notice cue, a user associated with the MS selects the broadcast channel for receiving the message. This may be accomplished, for example, by pressing a "connect" button, a similar control button, or a suitable sequence of control buttons. Alternatively, the user may select the broadcast channel by dialing "*" or any suitable character/number sequence. At step 108 the message is broadcast to the designated geographic area by a BS serving the cell in which the MS is located. This process again assumes the MS is currently operating within the designated geographic area and applies equally to other similarly situated MSs. Then, at step 126**, the MS receives the message broadcast. If the MS leaves the designated geographic area, the MS may no longer receive the message broadcast.

At step 116, the termination notice is received by the MS. This process again assumes the MS is currently operating within the designated geographic area and applies equally to other similarly situated MSs. At step 128, the MS activates a message termination cue in response to receiving the termination notice. Like the message notice cue, the message termination cue may include a visual indicator, an audible tone, a vibration frequency or any combination thereof as described above. However, the message termination cue may alternatively, for example, include extinguishing the visual indicator.

Figure 4:
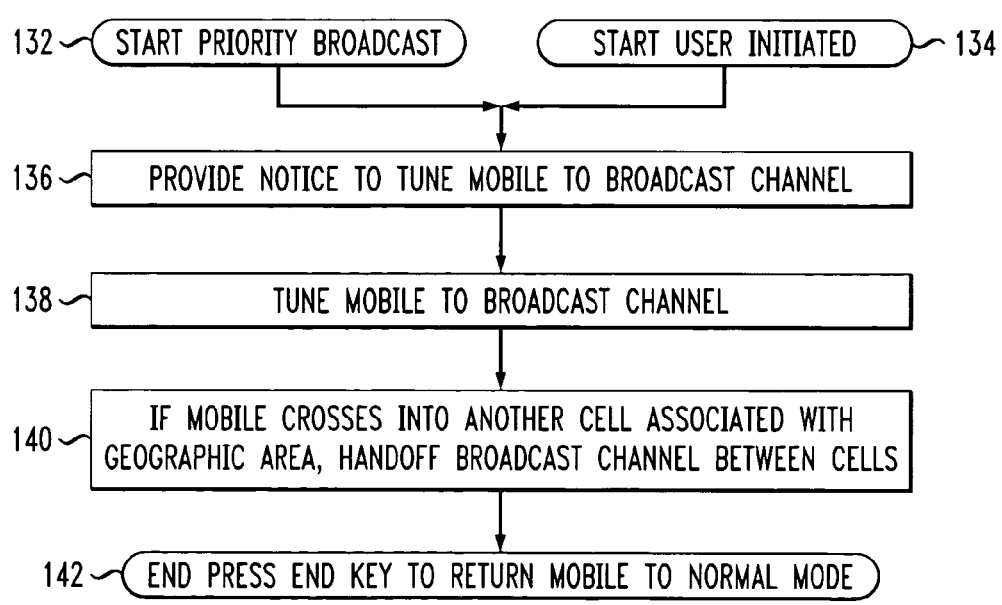
FIG. 4 is another flow chart of the embodiment of a method of message broadcast in a wireless network from a mobile station perspective.

With reference to FIG. 4, a process 130 for receiving a message broadcast at an MS starts at step 132 or step 134. This process assumes the MS is currently operating within the designated geographic area and applies equally to other similarly situated MSs. At step 132, the process 130 starts because a priority message is to be broadcast. This is typically associated with weather emergencies or other types of emergency alerts described above. At step 134, the process 130 starts because a user has initiated a request for access to a particular broadcast channel.

Next, at step 136, the MS provides notice to the user to tune the MS to a broadcast channel. This may in the form of instructions or other types of cues and may be either via display, audio, or combinations of both. At step 138, the user tunes the MS to the broadcast channel. For example, by pressing "*." Once the MS is tuned, the broadcasted message is provided to the user. If the user crosses into another cell associated with the geographic area designated for the message, the MS hands off the broadcast channel between the adjacent cells (step 140). The process is at its end when the message is over or when the user no longer desires to receive the message (step 142**). In order to return the MS to normal mode, the user presses, for example, the END key.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

I claim:

1. A method for broadcasting a message in a wireless network, the method including the steps:
   a) receiving a message notice that a message to be broadcast by the wireless network is to follow and instructions designating a geographic area associated with the message broadcast;
   b) transmitting the message notice to one or more mobile stations associated with the designated geographic area;
   c) receiving the message to be broadcast;
   d) broadcasting the message over a broadcast channel associated with the wireless network and the designated geographic area;
   e) receiving a termination notice associated with the message broadcast;
   f) terminating the message broadcast in response to receiving the termination notice; and
   g) transmitting the termination notice to the one or more mobile stations.

2. The method as set forth in claim 1 wherein the message notice, message, and termination notice are received from an emergency alert system (EAS).

3. The method as set forth in claim 2 wherein the message is associated with at least one of an emergency action notification, an emergency action termination, a national information center message, a national periodic test, a monthly test, a weekly test, an administrative action, an avalanche warning, an avalanche watch, a blizzard warning, a child abduction emergency, a civil danger warning, a civil emergency warning, a coastal flood warning, a coastal flood watch, a dust storm warning, an earthquake warning, an evacuation immediate condition, a fire warning, a flash flood warning, a flash flood watch, a flash flood statement, a flood warning, a flood watch, a flood statement, a hazardous materials warning, a high wind warning, a high wind watch, a hurricane warning, a hurricane watch, a hurricane statement, a law enforcement warning, a local area emergency, a network message notification, a 911 telephone outage emergency, a nuclear power plant warning, a practice/demo warning, a radiological hazard warning, a severe thunderstorm warning, a severe thunderstorm watch, a severe weather statement, a shelter in place warning, a special marine warning, a special weather statement, a tornado warning, a tornado watch, a tropical storm warning, a tropical storm watch, a tsunami warning, a tsunami watch, a volcano warning, a winter storm warning, and a winter storm watch.

4. The method as set forth in claim 2 wherein the message is associated with at least one of a presidential message, a local area message, a state message, and a national information center message.

5. The method as set forth in claim 2 wherein the message is associated with at least one of a weather service agency, an emergency management agency, a law enforcement agency, a security agency, and a public office.

6. The method as set forth in claim 1 wherein the message notice, message, and termination notice are received from at least one of a broadcast network, a cable network, a program supplier, an AM broadcast station, an FM broadcast station, a low power FM (LPFM) broadcast station, a TV broadcast station, a class A (CA) TV station, a low power TV (LPTV) station, a cable system, a wireless cable system, a multipoint distribution service (NDS) station, a multichannel multipoint distribution service (MMDS) station, and an instructional television fixed service (ITFS) station.

7. The method as set forth in claim 6 wherein the message is associated with at least one of a weather news report, a headline news report, a traffic news report, an entertainment segment, and a promotional advertisement.

8. The method as set forth in claim 1 wherein the message notice, message, and termination notice are received by a public switched telephone network.

9. The method as set forth in claim 8 wherein the message notice, message, and termination notice are communicated from the public switched telephone network to a one or more mobile switching centers.

10. The method as set forth in claim 9 wherein the message notice, message, and termination notice are communicated from the one or more mobile switching centers to one or more base stations associated with the designated geographic area, each base station associated with a cell of the wireless network.

11. The method as set forth in claim 10 wherein the message notice and termination notice are transmitted from the one or more base stations to the one or more mobile stations.

12. The method as set forth in claim 10 wherein the message is broadcast from the one or more base stations to the one or more mobile stations.

13. The method as set forth in claim 1, between steps b) and c), the method further including:

h) at the one or more mobile stations, activating a message notice cue in response to receiving the message notice; and between steps d) and e), the method further including:

i) at any of the one or more mobile stations, responding to activation of one or more control buttons to connect the corresponding mobile station to the to the broadcast channel to receive the broadcast message.

14. The method as set forth in claim 13 wherein the message notice cue is at least one of a visual indicator, an audible tone, and a vibration frequency.

15. The method as set forth in claim 1, further including:

h) at the one or more mobile stations, activating a message termination cue in response to receiving the termination notice.

16. The method as set forth in claim 15 wherein the message termination cue is at least one of a visual indicator, an audible tone, and a vibration frequency.

17. A method for broadcasting a message in a wireless network, the method including the steps:

a) at one or more mobile switching centers, receiving a message notice that a message to be broadcast by the wireless network is to follow, receiving instructions designating a geographic area associated with the message broadcast, and communicating the message notice to one or more base stations associated with the designated geographic area;

b) at the one or more base stations, transmitting the message notice to one or more mobile stations associated with the designated geographic area;

c) at the one or more mobile stations, activating a message notice cue in response to receiving the message notice;

d) at the one or more mobile switching centers, receiving the message to be broadcast and communicating the message to the one or more base stations;

e) at the one or more base stations, broadcasting the message over a broadcast channel associated with the wireless network and the designated geographic area;

f) at any of the one or more mobile stations, responding to activation of one or more control buttons to connect the corresponding mobile station to the broadcast channel to receive the broadcast message;

g) at the one or more mobile switching centers, receiving a termination notice associated with the message and communicating the termination notice to the one or more base stations;

h) at the one or more mobile switching centers, terminating the message broadcast in response to receiving the termination notice;

i) at the one or more base stations, transmitting the termination notice to the one or more mobile stations; and j) at the one or more mobile stations, activating a message termination cue in response to receiving the termination notice.

18. The method as set forth in claim 17 wherein the message notice, message, and termination notice are received from an emergency alert system (EAS).

19. The method as set forth in claim 18 wherein the message is associated with at least one of a presidential message, a local area message, a state message, and a national information center message.

20. The method as set forth in claim 17 wherein the message is associated with at least one of a weather news report, a headline news report, a traffic news report, and a promotional advertisement.

21. A wireless network to augment a telecommunication system by broadcasting a message from the telecommunication system to mobile stations associated with the wireless network, the wireless network including:
- a means for receiving a message notice that the message to be broadcast by the wireless network is to follow and instructions designating a geographic area associated with the message broadcast;
- a means for transmitting the message notice to one or more mobile stations associated with the designated geographic area;
- a means for receiving the message to be broadcast;
- a means for broadcasting the message over a broadcast channel associated with the wireless network and the designated geographic area;
- a means for receiving a termination notice associated with the message;
- a means for terminating the message broadcast in response to receiving the termination notice; and
- a means for transmitting the termination notice to the one or more mobile stations.

22. The wireless network as set forth in claim 21 wherein the message notice, message, and termination notice are received from an emergency alert system (EAS).

23. The wireless network as set forth in claim 22 wherein the message is associated with at least one of a presidential message, a local area message, a state message, and a national information center message.

24. The wireless network as set forth in claim 21 wherein the message is associated with at least one of a weather news report, a headline news report, a traffic news report, and a promotional advertisement.

25. The wireless network as set forth in claim 21, further including:
- at the one or more mobile stations, a means for activating a message notice cue in response to receiving the message notice, and
- at any of the one or more mobile stations, a means for responding to activation of one or more control buttons to connect the corresponding mobile station to the broadcast channel to receive the broadcast message.

26. The wireless network as set forth in claim 21, further including:
- at the one or more mobile stations, a means for activating a message termination cue in response to receiving the termination notice.

* * * * *